(12) United States Patent
Mooney et al.

(10) Patent No.: US 7,680,708 B1
(45) Date of Patent: Mar. 16, 2010

(54) METHOD AND USER INTERFACE FOR ASSIGNING A TAX LINE ITEM TO A USER TRANSACTION

(75) Inventors: Nicholas Augustine Mooney, San Jose, CA (US); George A. Hansen, Danville, CA (US); Glynis L. Hively, San Jose, CA (US); David Raymond Larsen, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 79 days.

(21) Appl. No.: 11/799,268

(22) Filed: Apr. 30, 2007

(51) Int. Cl.
*G06F 17/22* (2006.01)
*G06Q 20/00* (2006.01)

(52) U.S. Cl. .......................................... 705/31; 705/19

(58) Field of Classification Search ................... 705/31, 705/26, 37, 16, 40, 27, 1, 35, 39
See application file for complete search history.

(56) References Cited

OTHER PUBLICATIONS

"Getting Started with Quicken Premier Home & Business", p. 11-13, 19-21,24,26,52, 2005.*
"Small Business Finance with Quicken Premier Home & Business 2006" [online], [retrieved on Sep. 11, 2008]. Retrieved from the Internet: <http://web.archive.org/web/20060206133534/quicken.intuit.com/commerce/catalog/produc.*
"Tracking How Much You Spend and Save"; Software Help Manual for Quicken 2000 Deluxe Program, Intuit, Inc.,p. 2, 1999.*

* cited by examiner

*Primary Examiner*—F. Zeender
*Assistant Examiner*—Hajime Rojas
(74) *Attorney, Agent, or Firm*—Osha • Liang LLP

(57) ABSTRACT

A method for associating a tax-line item to a user transaction in a financial management software application including obtaining the user transaction by the financial management software application, associating a first tax line item with the user transaction, where the tax line item is selected by accepting input from a user separately from categorizing the transaction, and presenting the user transaction and the first tax line item selected by the user.

32 Claims, 5 Drawing Sheets

TRANSACTION REGISTER 400

| Transactions 430 | Total 435 | Category 440 | Tax Line Item 450 | Sub Total 455 |
|---|---|---|---|---|
| Camino Health Center | $55 | Medical Expenses | Sched A: Doctors.... | $50 |
|  |  | Parking | None | $50 |
| Chase Mortgage Payment | $1057 | None | Sched C: Mort... | $1057 |
| Ramada Hotel | $350 | Dinner | None | $25 |
|  |  | Business Lodging | Select Line Item / Sched A: Medical... / Sched A: Doctors... / Sched B: Qualified... / Sched C: Business.. | $325 |
| Accupuncture Extreme | $75 | Medical Expenses | None | $75 |

Item A 405
Item B 410
Item C 415
Item D 420

FIGURE 4

METHOD AND USER INTERFACE FOR ASSIGNING A TAX LINE ITEM TO A USER TRANSACTION

BACKGROUND

Every year millions of transactions are documented for tax related purposes. Users (including any agents acting on behalf of the user) typically enter user transactions into financial management software as a way to document information prior to preparing for supplying information for tax purposes, planning budgets, determining expenses, determining net worth, projecting future financial condition, or performing any other financial event.

In addition, to efficiently track and/or classify transactions, it is helpful for users to group transactions into categories (i.e., determined by a type or classification of a transaction). Categories within a financial software application may be provided by default or be user-defined.

A category may be designated within a software application as tax-related if the category is one which will most likely contain transactions of interest when completing tax forms or supplying information for tax purposes. The designation of a category as tax-related may be determined by using either a default designation provided by the software vendor or a user-defined association.

In addition to being designated as tax-related, the category may also be associated with a tax line item. The tax line item relates to a line item that appears on a tax form for an entity with taxing authority, such as those issued by a federal government, state government, provincial government, county government, parish government, a school district, and/or other taxing authorities.

To designate a transaction as tax-related and associated with a specific tax line item, the transaction must be associated with a category designated as tax-related and associated with the specific tax line item. Once a transaction is associated with a tax-related category that is associated with a specific tax line item, the transaction becomes automatically and necessarily associated with the specific tax line item defined by the category, if any. If a user seeks to assign a transaction with a specific tax line time, but a category is either not designated as tax-related and/or not associated with a specific tax line item desired, an entirely new category (generally using a variation of the name for the prior category) with the required associations must be created.

SUMMARY

In general, in one aspect, the invention relates to a method for associating a tax-line item to a user transaction in a financial management software application. The method comprises obtaining the user transaction by the financial management software application, associating a first tax line item with the user transaction, where the tax line item is selected by accepting input from a user separately from categorizing the transaction, and presenting the user transaction and the first tax line item selected by the user.

In general, in one aspect, the invention relates to associating a tax-line item to a user transaction in a financial management software application. The method comprises obtaining a first user transaction by the financial management software application, associating a first category with the first user transaction to obtain a first categorized transaction, associating a first tax line item with the first categorized transaction, where the first tax line item is selected by accepting input from a user separately from categorizing the first user transaction, and storing the first tax line time with the first categorized transaction, and presenting the first categorized transaction and the first tax line item selected by the user.

In general, in one aspect, the invention relates to a user interface. The user interface comprises a first user transaction accepted as a first input from a user, a first tax line item selector configured to accept a second user input associating a first tax line item with the first user transaction, and a presenter configured to present the first user transaction and the first tax line item.

In general, in one aspect, the invention relates to a computer readable medium comprising instructions for associating a line item to a user transaction. The instructions comprise functionality for obtaining the user transaction, associating a first tax line item with the user transaction, where the tax line item is selected by accepting input from a user separately from categorizing the transaction, and presenting the user transaction and the first tax line item selected by the user.

BRIEF DESCRIPTION OF DRAWINGS

FIG. 4 shows an example of a user interface in accordance with one or more embodiments of the invention.

DETAILED DESCRIPTION

Figure 1:
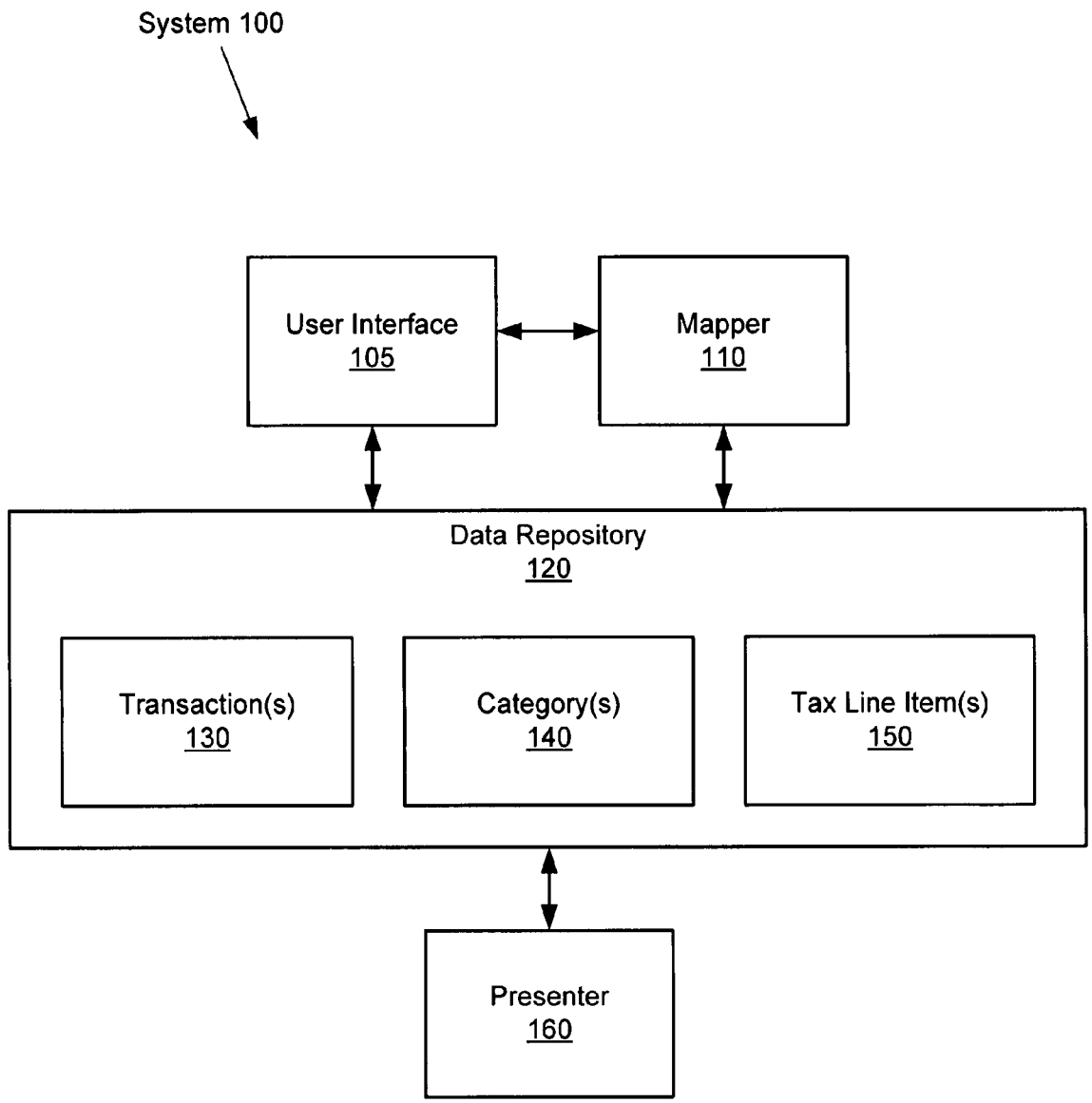
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In general, embodiments of the invention provide a method and user interface for associating a user transaction with a tax-line item. Specifically, embodiments of the invention allow for associating a categorized or a non-categorized transaction with a tax line item.

FIG. 1 shows a diagram of a system in accordance with one or more embodiments of the invention. As shown in FIG. 1, the system (100) includes a user interface (105), a mapper (110), a data repository (120), and a presenter (160). Each of these components are described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments.

Figure 2:
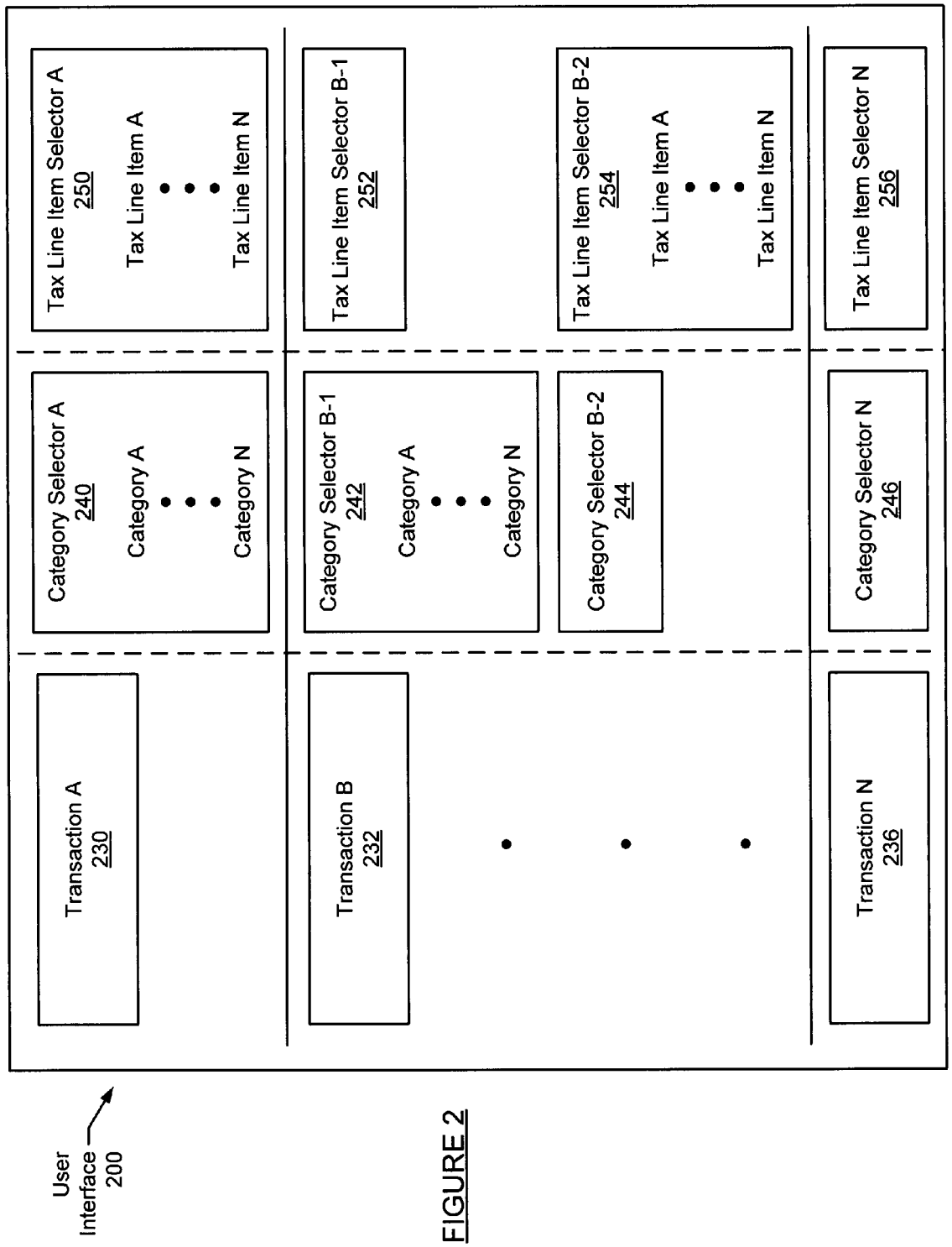
FIG. 2 shows a diagram of a user interface in accordance with one or more embodiments of the invention.

In one or more embodiments of the invention, the user interface (105) corresponds to an interface with functionality to provide access to one or more users of the system (100) and any services provided by the system (105) in accordance with one or more embodiments of the invention. The user interface (105) includes functionality to accept input from a user, which may then be stored in the data repository (120), and display any data from the data repository (120) (or other source within the system (100)) to a user. A user interface (105) may receive input from a user through a keyboard, mouse, or any other device that allows a user to submit input. Further, the user interface (105) may also be used to import input from a third party software application, download input via the World Wide Web, and/or read input from a file. Often, the input is transferred using one or more protocols specific to financial networks, which may require mapping or translation to a format acceptable to the user interface. Further, because of the secure nature of financial information, the input is typically transferred using secure transport mechanisms known in the art. Specific components of an exemplary user interface (105) are shown in FIG. 2 in accordance with one or more embodiments of the invention.

Further, the user interface (105) may be implemented as a web interface, graphical user interface (GUI), command line interface, or other interface accessible through a computer system. In one or more embodiments of the invention, the user interface (105) includes one or more web pages that can be reached from a computer with a web browser and/or internet connection. Alternatively, the user interface (105) may be an application that resides on a computing system, such as personal computers (PCs), mobile phones, personal digital assistants (PDAs), and/or other digital computing devices of the users and that communicate with the system (100) via one or more network connections and protocols. Regardless of the architecture of the system, communications between the system (100) and the user interface (105) may be secure, as described above.

Continuing with FIG. 1, the mapper (110) corresponds to a process or application that includes functionality to map input from the user interface (105) to the data repository (120) in accordance with one or more embodiments of the invention. The mapper (110) may receive data from the user interface (105) that is tokenized or alternatively may receive an input sequence that requires some sort of analytical process. In one or more embodiments of the invention, the mapper (110) includes functionality to analyze an input sequence to determine its grammatical structure with respect to a predetermined grammatical structure. Once the input is identified, the mapper (110) may store the input into the corresponding data structure in the data repository (120).

In one or more embodiments of the invention, the user interface (105) and the mapper (110) may be part of a financial management software application (not shown). The financial management software application may interact with multiple applications, data repositories, and/or interfaces for providing the services associated with the system (100) as required for one or more embodiments of the invention.

In one or more embodiments of the invention, the data repository (120) includes functionality to store one or more transaction(s) (130), one or more category(s) (140), and/or one or more tax line item(s) (150). In one or more embodiments of the invention, access to the data repository (120) is restricted. As such, access to the data repository (120) may require authentication using passwords, secret questions, personal identification numbers (PINs), and/or biometrics and/or any other suitable authentication mechanism. Those skilled in the art will appreciate that elements stored in the data repository (120) may be distributed and stored in multiple data repositories. In one or more embodiments of the invention, the data repository (120) is implemented using a database, a hierarchical (flat) file, or any suitable data store.

In one or more embodiments of the invention, the transaction(s) (130) corresponds to one or more financial records related to a user. The transaction(s) (130) may be a record of a payment, a deposit, a donation, a purchase, a gift, or any other record that is financially related to a user. Examples of transaction(s) (130) may include (but not be limited to) records related to a mortgage payment, a gift received, a gift made, a product purchase, a purchase of services, a loan payment, a medical expense, a hotel payment, revenue, loss, investments, a church contribution, a family vacation expense, and/or a business trip expense.

The transaction(s) (130) stored in the data repository (120) may encompass a series of multiple sub-transactions with corresponding dollar values, in accordance with one or more embodiments of the invention. Each of the transaction(s) (130) or sub-transaction may be stored as a node in a linked list, a heap, an entry in an array or in any other suitable data structure. Furthermore, each sub-transaction in a transaction may be deemed a tax related transaction or non-tax related transaction individually.

Continuing with FIG. 1, the category(s) (140) correspond to a grouping created to track and/or classify the transaction(s) (130) or sub-transactions in accordance with one or more embodiments of the invention. Examples of the category(s) (140) may include (but not be limited to) medical expenses, salary, groceries, entertainment, parking, business expenses, vacations, home repair, interest expense, interest income, and/or auto repair. As discussed above, the category(s) (140) may be designated within a financial management software application as tax-related if the category is one which will most likely contain transactions of interest when completing tax forms or supplying information for tax purposes. Accordingly, each of the category(s) (140) stored in the data repository (120) may include data indicating whether the category(s) (140) are tax-related or non tax-related. The designation as a tax-related or non tax-related category may be modified (e.g., by a financial management software application or by a user using a user interface (105)).

The transaction(s) (130) and category(s) (140) may be entered by a user using a user interface (e.g., user interface (105)), uploaded from a computer readable medium, downloaded from the internet, provided as a default list of common transactions and categories made available by a financial management software application, and/or provided for storage in the data repository (120) through any other suitable method. In one or more embodiments of the invention, each of the transaction(s) (130) or sub-transactions thereof may individually be associated with category(s) (140). The transaction(s) (130) or sub-transaction may be categorized by a user using a user interface (e.g. user interface (105)). One skilled in the art will appreciate that not all transactions(s) (130) are assigned a category.

To store the categorized transactions, the data repository (120) may contain multiple nodes that form a data structure representing a categorized sub-transaction or transaction(s) (130). Each node may individually contain category information associated with the transaction(s) (130). Alternatively, the data repository (120) may be structured as a list of the category(s) (140), where each node in a data structure represents one or more category(s) (140) and attributes of the node include transaction(s) (130) and sub-transactions that are associated with the category.

For example, consider a scenario where a user lists a transaction at a retail drug store. The transaction includes two sub-transactions, namely prescription drug expenses at the drug store pharmacy and cosmetics purchases at the drug store checkout counter. In this example, both sub-transactions are associated with a dollar amount and may also be associated with a category. The prescription drug expenses may be associated with a category designated as tax deductible, whereas the cosmetics may be associated with a category as non tax deductible or no category. Accordingly, the drug store transaction may be stored as a data structure that includes a linked list of nodes for each sub-transaction. The first node may contain a "medical expenses" category and the amount paid for the prescription drugs, whereas the second node may contain no category and the amount paid for the cosmetics. This data structure may then be presented to the user through the user interface (105) or other form.

Continuing with FIG. 1, tax line item(s) (150) correspond to a tax-related designation based on a tax related form or a tax related worksheet in accordance with one or more embodiments of the invention. One or more transaction(s) (130) associated with one or more tax line item(s) (150) are used to calculate a value for a corresponding line on a tax form or a tax related worksheet for any taxing authority. For example, transactions that relate to out of pocket fees paid to doctors, dentists, surgeons, the cost of hospitalization and related fees, and/or medical premiums paid may be associated with the tax line item "Schedule A: Doctors, Dentists, Hospitals" of an Internal Revenue Service tax form to pay federal taxes. The total dollar amount for these transactions corresponding to the tax line item is used to determine the value of a line in a Schedule A Form for the Internal Revenue Service. Similarly, the value may be determined to be properly listed on a tax form associated with a county, city, state, province, school district, etc.

In accordance with one or more embodiments of the invention, a transaction (130) may directly be associated with a tax line item (150), or alternatively, the transaction (130) may indirectly be associated with a tax line item (150) through a category (140).

A transaction (130) (or sub-transaction) that is directly associated with a line item (150) may be categorized or uncategorized. Further, when the transaction (130) is directly associated with a tax line item (150), data regarding the direct association is stored in the data repository (120). For example, the data repository (120) may contain a table of transactions (130) associated with each tax line item (150) and may further contain a total dollar amount of the transactions associated with the tax line item (150). Each transaction (130) (or sub-transaction) may also be stored as a data structure with an attribute corresponding to the tax line item (150) and an attribute corresponding to a category (140). Both attributes corresponding to the tax line item (150) and the category (140) may be individually modified for each transaction (130) or sub-transaction.

When a transaction (130) is associated with a category (140) and the category (140) is associated with the tax line item (150), the transaction (130) is indirectly associated with the tax line item (150). In this case, the data repository (120) is not required to store the association between the transaction (130) and the tax line item (150) as the tax line item (150) may be determined as a function of the category (140) associated with the transaction (120). Therefore, if a category (140) is modified, the tax line item (150) indirectly associated with the categorized transaction (130) will automatically be updated accordingly. Furthermore, certain categories (140) may not be associated with any tax line items (150) and therefore transactions (130) associated with such categories (130) may only be associated with a tax line item (150) through direct association described above.

Described below is one exemplary implementation of a data structure involving a table used for storage in the data repository. The exemplary implementation is not intended to limit the invention. For purposes of this example, the table includes a transaction column, a category column, an overwrite column, and a tax line item column. The values in the overwrite column may indicate whether the default tax line item associated with the category is to be used for a categorized transaction or if the default tax line item is overwritten with a new tax line item to be used for the transaction. Accordingly, when a categorized transaction is accessed, and the overwrite column indicates no overwrite, the tax line item associated with the category is returned (i.e., null if no tax line item is associated with the category). However, when the overwrite column indicates an overwrite, the tax line item column is accessed to determine the tax line item associated directly with the transaction. The directly associated tax line item value may be set to a different tax line item from the default or may be set to null.

Continuing with FIG. 1, the presenter (160) presents a transaction (130), a category (140) and/or a tax line item (150) in various manners in accordance with one or more embodiments of the invention. For example the presentation may be made via a monitor, a print out, a data export, a website, a mobile device, a kiosk, to a third part software application, or through any other suitable means. The presenter (160) may correspond to any interface (including user interface (105)), that presents the data locally or over a network. The presenter (160) includes functionality to select a portion or all of the data available. The presenter may select a portion of the data by querying the database (120) for transactions (130), categories (140), tax line items (150), the dollar amount associated with transactions (130), the dollar amount associated with a category (140), the dollar amount associated with a tax line item (150), transactions (130) directly associated with tax line items (150), transactions (130) indirectly associated with tax line items (150), transactions not associated with tax line items (150), categories (140) associated with tax line items (150), categories not associated with tax line items (150), categories (130) that are used, categories that are not used (140), or any other suitable search criteria. The presenter (160) may directly present the results of the query or generate reports based on an analysis of the results.

FIG. 2 shows a user interface (200) in accordance with one or more embodiments of the invention that is essentially the same as user interface (105) from FIG. 1. The user interface (200) includes transactions (e.g., transaction A (230), transaction B (232) . . . transaction N (236)), category selectors (e.g., category selector A (240), category selector B-1 (242), category selector B-2 (244) . . . category selector N (246)), tax line item selectors (e.g., tax line item selector A (250), tax line item selector B-1 (252), tax line item selector B-2 (254) . . . tax line item selector N (256)) and/or a tax relation indicator (not shown). The user interface (200) may show these components in different arrangements, configurations, using multiple windows, using partial views, hiding unused or blank fields, in pop up windows, or in any other manner necessary to accomplish one or more embodiments of the invention.

In one or more embodiments of the invention, the transactions (e.g., transaction A (230), transaction B (232) . . . transaction N (236)) are essentially the same as transaction (130) from FIG. 1. As described in FIG. 1, the transactions may be obtained in any manner required to be displayed by the user interface (200). The transactions may be represented by words, a line, a paragraph, a set of numbers, symbols, a chart, or any other suitable representation. The transactions may be modified, deleted, or inserted using user interface (200).

In one or more embodiments of the invention, the category selectors (e.g., category selector A (240), category selector B-1 (242), category selector B-2 (244) . . . category selector N (246)) correspond to components that include functionality to allow a user to associate one of the preexisting categories (e.g., category A . . . category N which are essentially the same as category (140) from FIG. 1) with the corresponding transaction (e.g., transaction A (230), transaction B (232) . . . transaction N (236)), import a category from another source (e.g., a third party software application or file), define a new category (not shown) to associate with the corresponding transaction (e.g., transaction A (230), transaction B (232) . . . transaction N (236)), and display the selected or defined category.

If a pre-existing category is selected using a category selector (e.g., category selector A (240), category selector B-1 (242), category selector B-2 (244) . . . category selector N (246)) that is associated with a tax line item (e.g., tax line time A . . . tax line item N which are essentially the same as tax line item (150) from FIG. 1), the associated tax line item is automatically associated with the transaction. In this case, the transaction is indirectly associated with the tax line item, through the selected category. The associated tax line item may be displayed using tax line item selectors (e.g., tax line item selector A (250), tax line item selector B-1 (252), tax line item selector B-2 (254) . . . tax line item selector N (256)). In one or more embodiments of the invention, the tax line item selectors (e.g., tax line item selector A (250), tax line item selector B-1 (252), tax line item selector B-2 (254) . . . tax line item selector N (256)) correspond to components that include functionality to allow a user to disassociate a default tax line item based on the category, associate one of the preexisting tax line items (e.g., tax line item A . . . tax line item N which are essentially the same as tax line item (150) from FIG. 1) with the corresponding transaction (e.g., transaction A (230), transaction B (232) . . . transaction N (236)), import a tax line item from another source (e.g., a third party software application, file, IRS website, tax company, or any other suitable source), and display the selected tax line item. The tax line item selectors (e.g., tax line item selector A (250), tax line item selector B-1 (252), tax line item selector B-2 (254) . . . tax line item selector N (256)) may allow a user to select from a list of all available tax line items, the most recently used tax line items, tax line items based on a form, tax line items based on a user's business, or any other suitable grouping of relevant tax line items.

Continuing with FIG. 2, category selectors (e.g., category selector A (240), category selector B-1 (242), category selector B-2 (244) . . . category selector N (246)) and tax line item selectors (e.g., tax line item selector A (250), tax line item selector B-1 (252), tax line item selector B-2 (254) . . . tax line item selector N (256)) may be implemented using drop down menus, pop up windows, radio buttons, check boxes, blank fields, matching, text messages, email messages, or any other suitable implementation. For example, the category selectors (e.g., category selector A (240), category selector B-1 (242), category selector B-2 (244) . . . category selector N (246)) may be activated by double clicking on a transaction to open up a pop up window that allows a user to type in a category for association with the corresponding transaction. Furthermore, the category selectors (240, 242, 244, and 246) and/or line item selectors (e.g., tax line item selector A (250), tax line item selector B-1 (252), tax line item selector B-2 (254) . . . tax line item selector N (256)) may display or represent the associated category through colors, symbols, or other visual representations. For example, if a user generally uses only five categories for classifying all transactions, the user may be able to use five different color patterns or shading to indicate the designated category for any particular transaction.

As shown in FIG. 2, transaction A (230) corresponds to a transaction that does not include sub-transactions and is associated with category selector A (240) and tax line item selector A (250). Category selector A (240) allows a user to select a category for association with transaction A (230). However, the corresponding tax line item selector A (250) is not affected by the category selection made using category selector A (240) because the tax line item selector A (250) is overwritten by the user. In one or more embodiments of the invention, an overwritten tax line item selector (e.g., tax line item selector A (250)) corresponds to a tax line item selector that is manually altered by the user to designate a tax line item (or no tax line item) separate from the tax line item that is associated with a selected category by default. Further, an overwritten tax line item selector corresponds to a tax line item selector that is selected where no category is selected or the category selected is not designated as a tax-related category, thus no tax line item is associated with a category (by default or otherwise) in accordance with one or more embodiments of the invention.

Transaction B (232) corresponds to a split transaction with each portion (or subsection) of the transaction having separate category selectors (i.e., category selector B-1 (242) and category selector B-2 (244), corresponding to a first split portion (or sub-transaction) and a second split portion (or sub-transaction), respectively). Category Selector B-1 (242) is used to associate a first category with a first sub-transaction of transaction B (232). Tax line item selector B-1 (252) automatically updates and displays the tax line item associated with the selected category, thereby associating the tax line item with the first split portion (or sub-transaction) of transaction B (232). Of course, the option exists for the user to alter the tax line item following the automatic update of tax line item to any tax line item the user selects (regardless of the category) or alter the tax line item selector A (250) to be empty.

The second split portion (or sub-transaction) of transaction B (232) corresponds to category selector B-2 (244) and tax line item selector B-2 (254). However, category selector B-2 (244) is an unused category selector and does not display a category. The user uses only the tax line item selector B-2 (254) for the second sub-transaction of transaction B (232) for directly associating a tax line item with the second sub-transaction without the use of a category.

An example of such a split transaction may involve a transaction for a mortgage payment including home owner's insurance and tax deductible mortgage interest and/or county property tax. In this case, a user may use the first category selector to define "insurance" as the category which defaults to "none" for the corresponding first tax line item selector and enters a corresponding dollar amount. Further the user ignores the second category selector and simply selects "Schedule C: Mortgage Interest" using the second tax line item selector and enters a corresponding dollar amount. Therefore, the user is able to use a tax line item selection based on a categorized transaction in the first split portion and is able to directly make a tax line item selection without defining a category in the second split portion because the user is familiar with the tax line item for mortgage interest.

In one or more embodiments of the invention, a tax relation indicator (not shown) corresponds to a visualization of a relation to a tax form. The visualization may indicate that a transaction (230) or a category (140) is related to a tax form. Examples of tax relation indicators include but are not limited to icons, highlighting, underlining, arrows, bold, font, colors, or any other visual indication of a tax relation. A tax relation indicator may be activated upon the relation determination by default, by scrolling, by hovering, by selecting or by any other method. For example, any category related to a tax form may be highlighted in a particular color. Further, different colors may represent different relations. Another example may involve a transaction associated with a tax line item. A transaction such as annual income received may be underlined to indicate a tax form relation.

Figure 3:
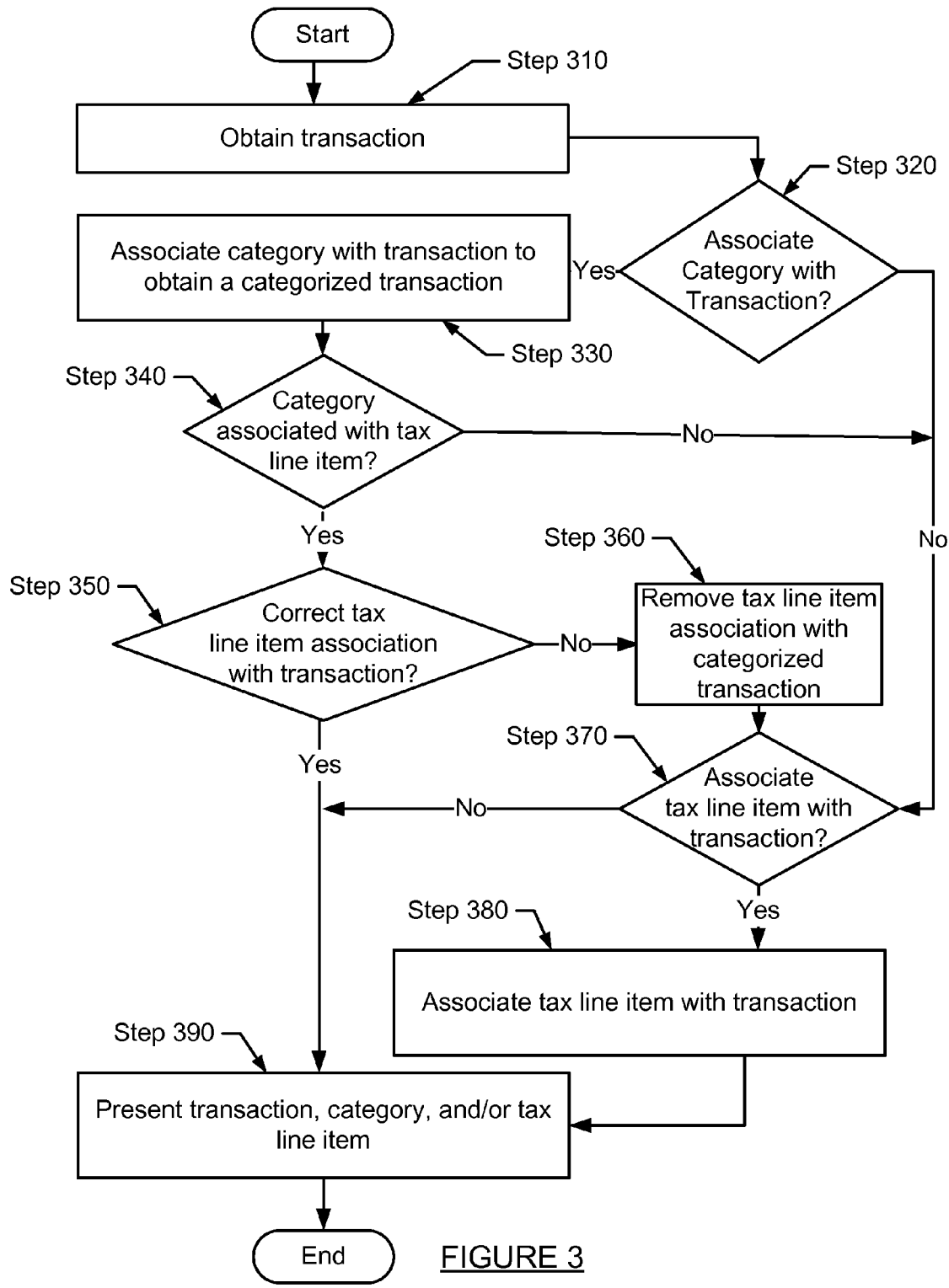
FIG. 3 shows a flow chart in accordance with one or more embodiments of the invention.
Figure 5:
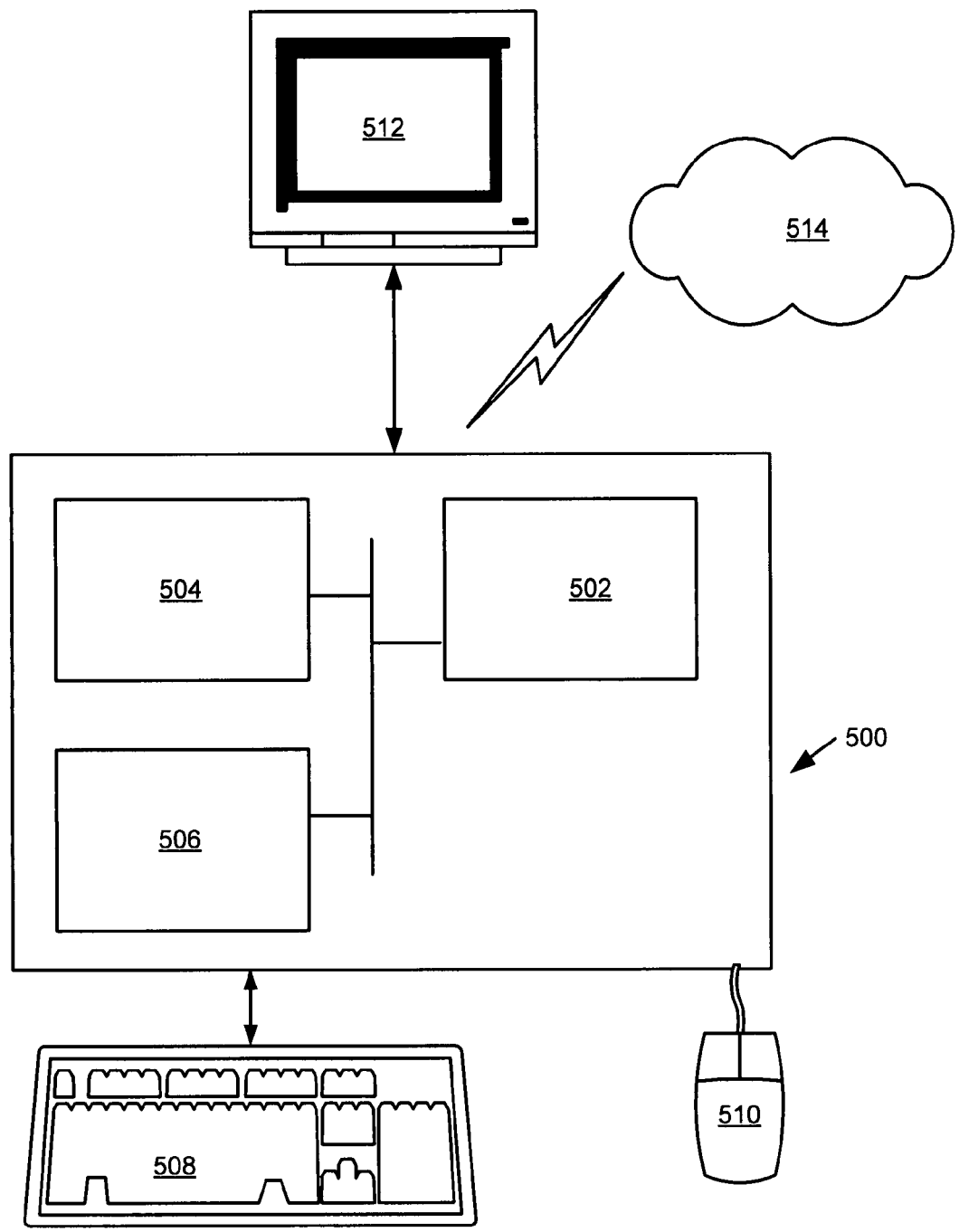
FIG. 5 shows a computer system in accordance with one or more embodiments of the invention.

FIG. 3 shows a flowchart for associating a tax-line item to a user transaction in a financial management software application in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a transaction related to a user is obtained (Step 310). In one or more embodiments of the invention, the transaction may be obtained by entering the transaction, importing the transaction, selecting the transaction, receiving the transaction, copying the transaction, downloading the transaction, accessing a report associated with the transaction or by any other suitable method. The transaction may be entered using a user interface, such as a GUI or web interface, or may be uploaded in one or more documents, such as word processing documents, spreadsheets, portable document format (PDF) files, etc. In addition, user-entered transaction may be optional because common transactions may already be provided by a financial management software application. Further, each obtained transaction may be split into multiple portions (i.e., split portions or sub-transactions) where each portion is associated with a dollar amount.

Next, a decision whether to associate a category with the transaction (or the sub-transaction) is made (Step 320). The decision to associate a category with the transaction could be based on whether an appropriate category already exists, whether a category needs to be made for that transaction, whether other similar transactions require a similar category, whether a user knows a tax line item associated with the transaction, whether the transaction is tax related, whether the user wishes to classify the transaction, whether the user wishes to efficiently track the transaction, whether the user wishes to be able to search for the transaction based on a category or for any other reason deemed relevant by the user.

A user may skip associating a category with the transaction and jump directly to Step 370, described below. Alternatively, a user may decide to associate a category with a transaction (or sub-transaction) (Step 330). In order to associate a category with the transaction, a user must first determine whether a suitable category exists. If a suitable category does not exist, the user can create a category or import a category from another source. Once a suitable category is available, the user can associate the category with the transaction to obtain a categorized transaction. A user may associate the category with the transaction by matching the category with the transaction, entering the category name, selecting the category from a list corresponding to the transaction or using any other suitable method. A user may also search for a category based on the transaction in order to determine the most suitable category for the transaction. In one or more embodiments of the invention, a user may associate multiple categories with the same transaction, where each category may correspond to a split portion (or sub-transaction). A user may also associate a category with a portion of the split portion (or sub-transaction) of the transaction.

Once a categorized transaction is obtained, a determination of whether the category is associated with a tax line item is made (Step 340). The determination is made based on whether a tax line item is automatically selected for the transaction based on the selected category. An automatically selected tax line item may be displayed to the user or an indication of a tax line item association for the category and/or transaction (or sub-transaction) may be displayed. If a tax line item is not automatically selected for the transaction based on the category, a user may decide whether to associate a tax line item directly with the transaction as discussed below in Step 370.

However, if a default tax line item is automatically selected for the transaction (or split portion of a transaction), then the user must decide whether the correct tax line item is associated with the transaction based on the category (Step 350). The user may make the decision based on prior experience, expert input, help menu, web research, a category description, a tax line item description, default financial management software application associations or other suitable basis. For example, a user may generally rely on default tax line item association for a category that is generated by a financial management software application.

If a user determines that an incorrect tax line item is associated with the transaction based on the category, the user removes the tax line item association with the transaction (Step 360). A user may remove the tax line item association without removing the category associated with the transaction, or remove both the category associated with the transaction and the tax line item associated with the transaction (or sub-transaction).

Next, a decision must be made whether to associate a tax line item directly with the transaction (Step 370). The decision may be based on whether the transaction is tax related, whether the user would benefit from associating the transaction with the tax line item, whether the user wishes to classify or track the transaction by tax line items or on any other relevant reason. A user may skip associating a tax line item with the transaction and jump directly to Step 390, described below.

Alternatively, a user may decide to associate a tax line item with the transaction (or sub-transaction) (Step 380). In order to associate a tax line item with the transaction, a user must first determine which tax line item is suitable for the transaction. If all tax line items are listed and none is suitable, a user may not be able to associate the tax line item with the transaction. However, if only a portion of the tax line items are listed, a user may import, or list additional tax line items that are suitable for the transaction. A user may associate the tax line item with the transaction by matching the tax line item with the transaction, entering the tax line item, selecting the tax line item from a list corresponding to the transaction or using any other suitable method. A user may also search for a tax line item based on the transaction in order to determine the most suitable tax line item for the transaction. In one or more embodiments of the invention, a user may associate a different tax line item for different split portions (or sub-transactions) of the transaction. Furthermore, a user may also leave some split portions (or sub-transactions) without a tax line item and associate a tax line item with other split portions (or sub-transactions).

Finally, a transaction, a category, and/or tax line item is/are presented (Step 390). A component (e.g. a transaction, a category, and/or tax line item) may be presented by exporting, storing, displaying, searching, printing, publishing, or by any other suitable manner. For example, a list of transactions associated with a particular tax line item or a particular category may be exported to another software application or analyzed to determine a value for a line corresponding to a tax form. In one or more embodiments of the invention, presenting one or more components may include populating a field in a tax form. In one or more embodiments of the invention, presenting includes generating a report based on the components. For example, a report based on all expenses for each category may be generated based on the data collected.

FIG. 4 shows an example of a user interface in accordance with one or more embodiments of the invention and is in no way intended to limit the invention. The transaction register (400) includes various components including columns for transactions (430), total (435), category (440), tax line item (450), and sub total (455). The transaction register (400) includes several transactions related to a user. As described above, the transactions may be obtained in various ways.

In this example, Item A (405) corresponds to a transaction at "Camino Health Center" (i.e., a medical facility) that costs a total of $55. The transaction is split into two portions. The first split portion is associated with a category for medical expenses totaling $50. The second split portion is associated with a category for and one for parking totaling $5. When entering the transaction, the first split portion of the transaction, which is associated with the medical expenses category is associated automatically with a tax line item corresponding to "Sched A: Doctors & Dentists," which is referring to the IRS form on which the information from the transaction should appear. Further, as shown in FIG. 4, the second split portion, which is associated with the category for parking, is not shown with a tax line item, as this category is not relevant to any field related to a tax form as related to this transaction. One skilled in the art will appreciate that if the second split portion was related to parking costs associated with a charitable event, the tax line item may be altered to show "Sched C: Charitable Expenses."

Continuing with FIG. 4, Item B (410) corresponds to a transaction for "Chase Mortgage Payment" (i.e., a mortgage company) totaling $1057. The user has not categorized this transaction; however the transaction has been associated directly with a tax line item. In this example, while not categorized, the mortgage payment is all mortgage interest on a loan and therefore the tax line item is indicated as "Sched C: Mortgage Interest."

Item C (415) corresponds to a transaction for "Ramada Hotel" (i.e., a hotel chain) totaling $350. A first split portion of the expense has been selected as related to the "Business Lodging" category and is selecting a tax line item associated with the business lodging portion of the transaction. Further, the second split portion corresponding to $25 of the total expense is categorized as "Dinner" with an empty tax line item because the user deemed the dinner as unrelated to tax.

Item D (420) corresponds to a transaction for "Acupuncture Extreme" (i.e., an Acupuncture treatment) totaling $75. "Medical Expenses" is the selected category and the tax line item "Schedule A: Doctors & Dentists" is typically set as default and automatically associated with the transaction. However, although acupuncture is a medical expense, the user realized that it is not a deductible medical expense or related to any tax form and therefore disassociated the tax line item by selecting non for the tax line item.

The invention may be implemented on virtually any type of computer regardless of the platform being used. For example, as shown in FIG. 8, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a LAN or a WAN (e.g., the Internet) (514) via a network interface connection. Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system.

In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method executable by a processor on a computer system for associating tax line items to transactions in a financial management software application, comprising:
    obtaining a user transaction by the financial management software application, wherein the user transaction comprises a first split and a second split;
    associating the user transaction with a transaction category to obtain a categorized transaction, wherein both the first split and the second split of the categorized transaction are associated with a default tax line item based on the transaction category;
    using the processor of the computer system:
        changing the default tax line item for the second split to a first user-defined tax line item, wherein the first user-defined tax line item is selected by accepting input from a user, and wherein the default tax line item and the first user-defined tax line item are different; and
        presenting the categorized transaction as output, wherein the first split is associated with the default tax line item and the second split is associated with the first user-defined tax line item.

2. The method of claim 1, further comprising:
    storing the second split associated with the first user-defined tax line item separately from the first split associated with the default tax line item.

3. The method of claim 1 further comprising:
    changing the default tax line item associated with the first split of the categorized transaction to a second user-defined tax line item, wherein the default tax line item and the second user-defined tax line item are different.

4. The method of claim 1 further comprising:
    associating a second user-defined tax line item with the second split of the categorized transaction, wherein the first user-defined tax line item is removed based on a user selection for the second split of the categorized transaction.

5. The method of claim 1, wherein presenting the categorized transaction comprises exporting the first split associated with the default tax line item and the second split associated with the first user-defined tax line item to a third party software application.

6. The method of claim 1, wherein presenting the categorized transaction comprises at least one from a group consisting of displaying the first split associated with the default tax line item and the second split associated with the first user-defined tax line item, printing the first split associated with the default tax line item and the second split associated with the first user-defined tax line item, and storing the first split associated with the default tax line item and the second split associated with the first user-defined tax line item.

7. A method executable by a processor on a computer system for associating tax line items to user transactions in a financial management software application, comprising:
obtaining a user transaction by the financial management software application, wherein the user transaction comprises a first split and a second split;
associating a transaction category with the user transaction to obtain a categorized transaction, wherein both the first split and the second split of the categorized transaction are associated with a default tax line item based on the transaction category;
using the processor of the computer system:
changing the default tax line item for the second split to a first user-defined tax line item, wherein the first user-defined tax line item is selected by accepting input from a user, and wherein the default tax line item and the user-defined tax line item are different;
storing, on the computer system, the first user-defined tax line item with the second split of the categorized transaction; and
presenting the second split of the categorized transaction and the first user-defined tax line item as output.

8. The method of claim 7, further comprising:
obtaining an additional user transaction; and
associating a second user-defined tax line item with the additional user transaction, wherein the additional user transaction is a non-categorized transaction.

9. The method of claim 7, further comprising:
receiving the default tax line item associated with the transaction category prior to associating the first user-defined tax line item with the second split.

10. The method of claim 7, further comprising:
disassociating the default tax line item with the categorized transaction prior to associating the first user-defined tax line item with the second split.

11. The method of claim 7, wherein presenting the categorized transaction and the first user-defined tax line item comprises:
exporting the second split of the categorized transaction and the first user-defined tax line item to a third party software application.

12. The method of claim 7, wherein presenting the second split of the categorized transaction and the first user-defined tax line item comprises at least one from a group consisting of displaying the second split of the categorized transaction and the first user-defined tax line item and printing the second split of the categorized transaction and the first user-defined tax line item.

13. The method of claim 7, further comprising:
generating a tax report comprising information associated with the second split of the categorized transaction and the first user-defined tax line item.

14. The method of claim 7, further comprising:
searching for the second split of the categorized transaction based on the first user-defined tax line item.

15. The method of claim 7, further comprising:
searching for the second split of the categorized transaction based on the transaction category.

16. A system comprising:
a data repository arranged to store information on a storage device;
a user interface operatively coupled to the data repository and comprising:
a transaction field element associated with instructions executing on a processor configured to:
receive a user transaction as a first input from a user, wherein the user transaction comprises a first split and a second split;
a transaction category selector associated with instructions executing on a processor configured to:
associate a transaction category with the user transaction to obtain a categorized transaction, wherein both the first split and the second split of the categorized transaction are associated with a default tax line item based on the transaction category; and
a tax line item selector associated with instructions executing on a processor configured to accept a second user input changing the default tax line item for the second split to a first user-defined tax line item wherein the default tax line item and the first user-defined tax line item are different; and
a presenter operatively coupled to the data repository and associated with instructions executing on a processor configured to present the categorized transaction as output, wherein the first split is associated with the default tax line item and the second split is associated with the first user-defined tax line item.

17. The system of claim 16, wherein the default tax line item is associated with the categorized transaction based on a user selection.

18. The system of claim 16, wherein the default tax line item is associated with the categorized transaction based on a default selection.

19. The system of claim 16, wherein the tax line item selector is further configured to dissociate the first user-defined tax line item with the second split of the categorized transaction.

20. The system of claim 16, wherein the tax line item selector is configured to accept a third user input changing the default tax line item for the first split to a second user-defined tax line item, wherein the default tax line item and the second user-defined tax line item are different.

21. The system of claim 16, wherein the presenter is associated with instructions executing on a processor further configured to export the first split associated with the default tax line item and the second split associated with the first user-defined tax line item to a third party software application.

22. The system of claim 16, wherein the presenter is associated with instructions executing on a processor further configured to present by displaying the first split associated with the default tax line item and the second split associated with the first user-defined tax line item.

23. The system of claim 16, wherein the presenter is associated with instructions executing on a processor further configured to present by printing the first split associated with the default tax line item and the second split associated with the first user-defined tax line item.

24. The system of claim 16, wherein the presenter is associated with instructions executing on a processor further configured to present by storing the first split associated with the tax line item and the second split associated with the first user-defined tax line item.

25. The system of claim 16, wherein the presenter is associated with instructions executing on a processor further configured to search for the categorized transaction based on the first user-defined tax line item.

26. The system of claim 16, wherein the presenter is associated with instructions executing on a processor further configured to search for the categorized transaction based on the transaction category.

27. A computer readable medium comprising instructions for associating tax line items to user transactions in a financial management software application that, when executed on a computer, comprise functionality to:
   obtain a user transaction by the financial management software application, wherein the user transaction comprises a first split and a second split;
   associate the user transaction with a transaction category to obtain a categorized transaction, wherein both the first split and the second split of the categorized transaction are associated with a default tax line item based on the transaction category;
   change the default tax line item for the second split to a first user-defined tax line item wherein the first user-defined tax line item is selected by accepting input from a user, and wherein the default tax line item and the first user-defined tax line item are different; and
   present the transaction category as output, wherein the first split is associated with the default tax line item and the second split is associated with the first user-defined tax line item.

28. The computer readable medium of claim 27, further comprising instructions comprising functionality to:
   store the second split associated with the first user-defined tax line item separately from the first split associated with the default tax line item.

29. The computer readable medium of claim 27 further comprising instructions comprising functionality to:
   change the default tax line item associated with the first split of the categorized transaction to a second user-defined tax line item, wherein the default tax line item and the second user-defined tax line item are different.

30. The computer readable medium of claim 27 further comprising instructions comprising functionality to:
   associate a second user-defined tax line item with the second split of the categorized transaction, wherein the first user-defined tax line item is removed based on a user selection for the second split of the categorized transaction.

31. The computer readable medium of claim 27, wherein presenting the first split associated with the default tax line item and the second split associated with the first user-defined tax line item comprises exporting the first split associated with the default tax line item and the second split associated with the first user-defined tax line item to a third party software application.

32. The computer readable medium of claim 27, wherein presenting the first split associated with the default tax line item and the second split associated with the first user-defined tax line item comprises at least one from a group consisting of displaying the first split and the second split, printing the first split and the second split, and storing the first split and the second split.

* * * * *